US007137401B2

(12) United States Patent
Jovancicevic et al.

(10) Patent No.: US 7,137,401 B2
(45) **Date of Patent: *Nov. 21, 2006**

(54) DRAG REDUCTION USING MALEATED FATTY ACIDS

(75) Inventors: Vladimir Jovancicevic, Richmond, TX (US); Young Soo Ahn, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 615 days.

This patent is subject to a terminal disclaimer.

(21) Appl. No.: 09/944,835

(22) Filed: Aug. 30, 2001

(65) Prior Publication Data

US 2003/0060373 A1 Mar. 27, 2003

Related U.S. Application Data

(60) Provisional application No. 60/285,506, filed on Apr. 19, 2001.

(51) Int. Cl.

| | |
|---|---|
| ***F17D 1/16*** | (2006.01) |
| ***C09K 8/584*** | (2006.01) |
| ***B01F 17/00*** | (2006.01) |
| ***B01F 3/08*** | (2006.01) |

(52) U.S. Cl. ........................... 137/13; 516/19; 516/29; 516/73; 507/136; 507/137; 508/221; 508/232; 508/240; 508/269

(58) Field of Classification Search .................. 516/19, 516/29, 73; 507/136, 137; 252/579; 137/13; 508/221, 232, 240, 269

See application file for complete search history.

(56) References Cited

U.S. PATENT DOCUMENTS

| | | | | |
|---|---|---|---|---|
| 2,188,882 | A * | 1/1940 | Clocker | 549/253 |
| 2,188,890 | A * | 1/1940 | Clocker | 528/157 |
| 3,361,213 | A | 1/1968 | Savins | 169/44 |
| 3,981,682 | A * | 9/1976 | Ward et al. | 44/403 |
| 3,985,504 | A | 10/1976 | Kindscher et al. | 516/73 |
| 4,927,669 | A * | 5/1990 | Knox et al. | 427/239 |
| 5,292,480 | A * | 3/1994 | Fischer et al. | 507/939 |
| 5,385,616 | A | 1/1995 | Dougherty et al. | 148/248 |
| 5,582,792 | A * | 12/1996 | Dougherty et al. | 422/16 |
| 6,620,770 | B1 * | 9/2003 | Kirsner et al. | 516/29 |
| 6,774,094 | B1 * | 8/2004 | Jovancicevic et al. | 508/506 |

FOREIGN PATENT DOCUMENTS

| | | |
|---|---|---|
| DE | 2412112 | 9/1974 |
| WO | WO 99/31203 A1 | 6/1999 |

OTHER PUBLICATIONS

WPI Database, Section Ch, Week 198434, Derwent Publications Ltd., London, GB; AN 1984-209571, XP002212732 & JP 59 120688 A (Lion Corp), Jul. 12, 1984, Abstract.

Patent Abstracts of Japan, vol. 009, No. 130 (C-284), Jun. 5, 1985 & JP 60 018583 (Raion KK), Jan. 30, 1985, Abstract.

WPI Database, Sechtion Ch, Week 199339, Derwent Publications Ltd., London, GB; AN 1993-309922, XP002212731 & SU 1,152,241 A (As Uzb Eltm Inst), Oct. 23, 1992, Abstract.

PCT International Search Report for International Application No. PCT/US02/06868, Sep. 19, 2002.

Ying-Hsiao Li, et al., "Laboratory Tests and Field Implementation of Gas-Drag-Reduction Chemicals," SPE Production & Facilities, Feb. 1998, pp. 53-58.

J. G. Savins, "Contrasts in the Solution Drag Reduction Characteristics of Polymeric Solutions and Micellar Systems," in C. S. Wells, ed, Viscous Drag Reduction, Plenum Press, New York, 1969, pp. 183-212, month unknown.

W.-M. Kulicke, et al., "Drag Reduction with Special Emphasis on Homogeneous Polymer Solutions," Advances in Polymer Science, vol. 89, 1989, pp. 1-68, month unknown.

Y. Hu, et al., "Rheological and Rheo-optical Characterization of Shear-induced Structure Formation in a Nonionic Drag-Reducing Surfactant Solution," J. Rheol., vol. 41, No. 1, Jan./Feb. 1997, pp. 151-166.

A. Salem, et al., "The Effects of Heterogeneous Drag Reducing Surfactant in Drag and Heat Transfer Reduction in Crude Oil Systems," Chem. Eng. Comm. vol. 168, 1998, pp. 229-242.

J. L. Zakin, et al., "Surfactant Drag Reduction," Reviews in Chemical Engineering, vol. 14, Nos. 4-5, 1998, pp. 253-320, month unknown.

* cited by examiner

*Primary Examiner*—Daniel S. Metzmaier
(74) *Attorney, Agent, or Firm*—Madan Mossman & Sriram PC

(57) ABSTRACT

Non-polymeric drag reducing agents in the form of maleated fatty acids and the esters thereof and the organic, inorganic or amine salts thereof are described herein. These additives are useful to reduce drag in hydrocarbon fluids and multiphase fluids of hydrocarbon(s) and water. No injection probes or other special equipment is expected to be required to introduce the drag reducing agent into the liquid stream, nor is grinding (cryogenic or otherwise) of the additive necessary to form a suitable drag reducing agent. The drag reducing additives of the invention are not subject to shear degradation and do not cause undesirable changes in the emulsion or fluid quality of the fluid being treated, or undesirable foaming.

8 Claims, No Drawings

DRAG REDUCTION USING MALEATED FATTY ACIDS

CROSS-REFERENCE TO RELATED APPLICATION

This application claims the benefit of U.S. provisional application No. 60/285,506 filed Apr. 19, 2001.

FIELD OF THE INVENTION

The invention relates to agents to be added to fluids flowing through a conduit to reduce the drag therethrough, and most particularly relates, in one non-limiting embodiment, to non-polymeric drag reducing agents (DRAs) for liquids such as hydrocarbons, and emulsions of water and hydrocarbons.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries of ground polymer particulates. A problem generally experienced with simply grinding the polyalpha-olefins (PAOs) is that the particles will "cold flow" or stick together after the passage of time, thus making it impossible to place the PAO in the hydrocarbon in a form that will dissolve or otherwise mix with the hydrocarbon in an efficient manner. Further, the grinding process irreversibly degrades the polymer, thereby reducing the drag reduction efficiency of the polymer.

One common solution to preventing cold flow is to coat the ground polymer particles with an anti-agglomerating agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream.

Gel or solution DRAs have also been tried in the past. However, these drag reducing gels also demand specialized injection equipment, as well as pressurized delivery systems. They are also limited to about 10% polymer as a maximum concentration in a carrier fluid due to the high solution viscosity of these DRAs. Thus, transportation costs of the DRA are considerable, since up to about 90% of the volume being transported and handled is inert material.

Further, polymeric DRAs additionally suffer from the problem that the high molecular weight polymer molecules can be irreversibly degraded (reduced in size and thus effectiveness) when subjected to conditions of high shear, such as when they pass through a pump. Additionally, some polymeric DRAs can cause undesirable changes in emulsion or fluid quality, or cause foaming problems when used to reduce the drag of multiphase liquids.

Surfactants, such as quaternary ammonium salt cationic surfactants, are known drag reducing agents in aqueous (non-hydrocarbon) systems and have the advantage over polymeric DRAs in that they do not degrade irreversibly when sheared, In contrast, flow-nduced structures in surfactant solutions are reversible.

Thus, it would be desirable if a drag reducing agent could be developed which rapidly dissolves in the flowing hydrocarbon or emulsion, which could minimize or eliminate the need for special equipment for preparation and incorporation into the hydrocarbon or emulsion, and which could avoid shear degradation. It would be desirable to develop a drag reducing agent that does not cold flow and thus requires the use of cryogenic grinding and/or the extra addition of an anti-agglomeration additive.

SUMMARY OF THE INVENTION

An object of the invention is to provide a DRA that does not require the use of a polymeric material.

Other objects of the invention include providing a DRA that can be readily manufactured and which does not require special equipment for placement in a conduit transporting hydrocarbons or other fluids.

Another object of the invention is to provide a DRA that does not cold flow upon standing and is stable.

In carrying out these and other objects of the invention, there is provided, in one form, a method of reducing drag of a fluid involving first providing a fluid, and then adding to the fluid an amount of an additive effective to reduce the drag of the fluid. The additive or agent includes maleated fatty acids, esters and salts thereof.

DETAILED DESCRIPTION OF THE INVENTION

The present invention relates to methods and compositions for reducing drag in multiphase flowlines (for example oil/water, water/oil, oil/water/gas) in oil and gas production systems. It is expected that the invention could apply to any hydrocarbon fluid flowing in a pipeline, whether or not water is present. It will be appreciated that by the term "hydrocarbon fluid", it is expected that oxygenated hydrocarbons such as methanol, ethanol, ethers, and the like may be included within the definition. The term "hydrocarbon fluid" also means any fluid that contains hydrocarbons, as defined herein to also include oxygenated hydrocarbons.

Many oil and gas production systems (e.g. those found in deep water rigs of the Gulf of Mexico) are limited in their production due to pressure drop in the flowlines under turbulent flow regime. The drag reducing methods of the invention comprise applying maleated fatty acids or its esters and salts to the system by either batch or continuous treatments at high enough concentrations to produce the desired reduction in drag and/or increase in flow for the same amount of motive energy. The compositions containing maleated fatty acids are used effectively by maintaining drag reduction effectiveness over an extended period of time. The use of these anionic types of surfactants present distinct advantages over the use of conventional polymeric drag reducers including the facts that they are not shear sensitive and do not cause undesirable changes in emulsion, foaming or fluid quality. Without wishing to be limited to any particular mechanism of operation, the microstructures or associations between the molecules of the inventive additives are believed to reform after the fluid is sheared. Reduction in pressure drop in gas and oil multiphase flowlines using maleated fatty acid surfactants allows operators to increase production. The oil/water solubility and/or dispersibility characteristics of the maleated fatty acids can be varied to allow their use in a broad range of oil/water ratios. A mixture of maleated fatty acids with various oil/water solubilities can be used to cover a wide range of applications.

The drag reducing additives of this invention have the basic chemical structures of the maleated fatty acid drag reducers given below:

(I)

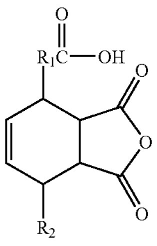

and (II)

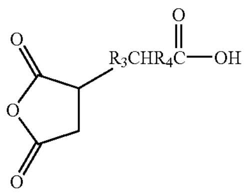

and esters of these maleated fatty acids may also be employed, having structures such as:

(III)

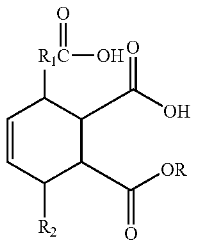

or (IV)

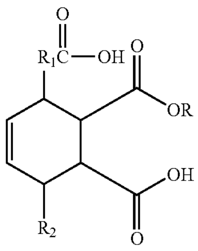

(V)

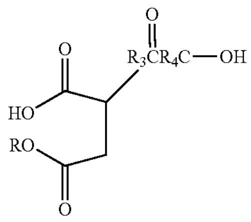

or

-continued (VI)

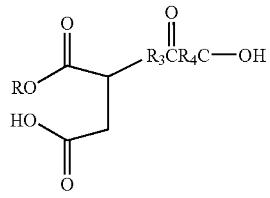

where R is an organic moiety including alkyl, aryl, aralkyl, alkaryl or amine groups;

$R_1$ is a generally linear organic moiety of from about 2 to about 20 carbon atoms;

$R_2$ is hydrogen or a generally linear organic moiety of up to about 20 carbon atoms, where the total number of carbon atoms in $R_1$ and $R_2$ are from about 10 to about 20 carbon atoms;

$R_3$ is an alkylene or alkenylene group of from about 2 to about 15 carbons; and $R_4$ is an alkylene or alkenylene group of from about 2 to about 15 carbons;

and inorganic, organic, and amine salts thereof. By "alkenylene" is meant a hydrocarbon moiety bonded on either end to the shown structures (similar to alkylene) but which is unsaturated with at least one C=C double bond.

In water, compounds of structures I and II hydrolyze to form compounds of structures III and IV, respectively, where R=H. Such compounds are considered to be within the scope of the invention.

In non-limiting, preferred embodiments, R has from about 1 to about 20 carbon atoms, preferably from about 1 to about 5 carbon atoms. Most of the substituents containing amine groups expected to be useful are expected to contain primary amine groups. The R substituent is that moiety from the alcoholic composition used to make the esters (III), (IV), (V) and/or (VI). The alcoholic reactant ROH may be an ethoxylated alcohol or phenol in one non-limiting embodiment.

In another non-limiting embodiment of the invention, $R_1$ may preferably have from 2 to about 18 carbon atoms, $R_2$ is hydrogen or an organic moiety of up to 18 carbon atoms; and the total number of carbon atoms in $R_1$ and $R_2$ ranges from about 10 to about 20 carbon atoms. In another non-limiting but preferred embodiment, $R_3$ and $R_4$ may independently range from about 2 to about 13 carbon atoms.

Specific maleated fatty acids and esters thereof include, but are not necessarily limited to, maleated oleic acid, maleated linoleic acid, and mixtures thereof. In one non-limiting embodiment of the invention, the additive is any one or more of structures III, IV and/or V where R is isopropyl.

Organic and inorganic salts of maleated fatty acids are also part of this invention, such as sodium and potassium salts as well as various amine salts (e.g. imidazolines). Suitable maleated fatty acids and salts thereof expected to be useful in the drag reducing methods of this invention include, but are not necessarily limited to imidazoline salts of; primary, secondary, and tertiary amine salts of; alkoxylated amine salts of; heterocyclic amine salts of maleated fatty acids and maleated fatty acid esters and mixtures thereof.

Specific salts of maleated fatty acids or salts of maleated fatty acid esters thereof include, but are not necessarily limited to, amine salts, amide salts, imidazoline salts, alkanolamine salts, and mixtures thereof.

In one non-limiting embodiment of the invention, the drag reducing additives herein are added in the absence of any polymeric drag reducing additive. In another non-limiting embodiment of the invention, the drag reducing additives are employed in the absence of any other drag reducing additive, i.e. one that does not fall within the definitions of this invention. On the other hand, there may be situations or environments where it is advantageous to employ other drag reducing additives together with those of this invention in effective mixtures, such mixtures being within the bounds of this invention. Mixtures of additives falling within the scope of this invention may of course be used.

Compounds such as these are also known corrosion inhibitors (e.g. U.S. Pat. Nos. 4,927,669; 5,385,616; 5,582,792) that have been used extensively. The use of maleated fatty acids as drag reducers that are the subject of this invention, however, requires substantially lower use concentrations than those for corrosion inhibition. The typical use levels in the actual system for drag reduction is approximately 5–10 times lower than that for corrosion inhibition, based on total system fluid, i.e from about 100 to 1000 ppm for methods of this invention, preferably from about 150 to about 600, and most preferably from about 200 to about 500 ppm. The maximum drag reduction effects observed, including both pressure reduction (ΔP) and flow increase (Q), in the laboratory testing were between 5–20%, depending on oil/water ratio, flow rates and type of test (Torque vs. Flow Loop). It will be appreciated that it is virtually impossible to predict in advance what an effective amount of drag reducing agent would be in any particular circumstance since, as noted, there are a number of interrelated factors that must be considered including, but not necessarily limited to, the type of fluid having its friction characteristics modified, the flow rate of the fluid, the temperature of the fluid, the nature of the DRA, etc. Thus, the dosage ranges given above and used in the Examples should be understood as illustrative only.

The preferred manner of practicing the invention is batch treatment between two pigs or continuous treatment at the well head or pipeline through umbilical or capillary. In the continuous treatment, the product solution is used at high enough concentration to produce the desired drag reduction without causing emulsion, foaming or other oil/water quality problems.

The maleated fatty acids, esters and salts thereof may be combined with any suitable solvent prior to use as a drag reducing agent. Such solvents include, but are not necessarily limited to, aromatic solvents, aliphatic solvents, alcohols, ethers, sulfoxides, and compatible mixtures thereof. To further illustrate the invention, the inventive method will be additionally described by way of the following non-limiting Examples, which are intended only to further show specific embodiments of the invention.

EXAMPLE 1

The initial screening of potential DRA candidates selected based on their chemistry was performed in the torque test. In this experiment, a cylinder spins at a constant rate in a cylindrical container, which contains the fluid. The cylinder is attached to a torque meter, which sends an analog voltage signal to an A/D converter that feeds a computer, Percent drag reduction for a particular DRA/solvent system is calculated from the changes in torque with and without DRA. The results of this Example for a maleated fatty acid A, and the ester B thereof at different concentrations in a synthetic hydrocarbon are shown in Table I. Both compounds exhibited measurable reduction in torque at 200 ppm.

TABLE I

Torque Test Data

| DRA | Concentration, ppm | Torque, oz. in | δ Torque (%) |
|---|---|---|---|
| Blank | | 0.720 | |
| A | 200 | 0.705 | 2.1 |
| A | 400 | 0.685 | 4.9 |
| B | 400 | 0.709 | 1.6 |

EXAMPLE 2

The final tests were carried out in the DRA flow loop with different oil/brine (O/B) ratios. A recirculated DRA flow loop was used to measure drag reduction properties (ΔP, flow, fluid density) of DRAs. The flow loop circulated 30 liters of fluid through a ½-inch ID stainless steel pipe (4-foot long section) equipped with a differential pressure transducer. Differential pressure (ΔP), flow rate (Q), fluid density, pressure and temperature were measured continuously during the test. Only the reduction in ΔP accompanied with a corresponding increase in Q as a result of the addition of DRA was considered as an indication of drag reduction.

The mass flow rate and density of fluids were measured using a mass flow meter, while ΔP was measured using a differential pressure transducer. The concentration of DRA was varied from 75–300 ppm. All experiments were carried out at 140° F. and 100 psi $CO_2$. The pressure drop (ΔP), flow rate (Q), change in pressure drop (δΔP), change in flow rate (δQ) and calculated Fanning friction factor (f) were obtained using A and B drag reducers as shown in Table II. The reduction in Fanning friction factor for these two chemicals in 70/30 oil/brine mixture was close to 25%.

TABLE II

DRA Flow Loop Data

| DRA | O/B Ratio | ΔP (psi) | δΔP(%) | Q (lb/min) | δQ | f |
|---|---|---|---|---|---|---|
| Blank | 30/70 | 6.90 | | 126.0 | | 0.0053 |
| | 50/50 | 6.70 | | 115.0 | | 0.047 |
| | 70/30 | 6.50 | | 117.0 | | 0.0041 |
| | 90/10 | 6.10 | | 95.0 | | 0.0055 |
| A | 30/70 | 6.64 | −3.8 | 130.5 | 3.6 | 0.0048 |
| | 50/50 | 6.33 | −5.6 | 120.5 | 4.8 | 0.0040 |
| | 70/30 | 5.71 | −12.1 | 125.9 | 7.6 | 0.0031 |
| | 90/10 | 5.87 | −3.7 | 98.3 | 3.5 | 0.0050 |
| B | 30/70 | 6.57 | −4.7 | 130.4 | 3.5 | 0.0047 |
| | 50/50 | 6.37 | −5.0 | 119.1 | 3.6 | 0.0042 |
| | 70/30 | 6.32 | −2.8 | 119.9 | 2.5 | 0.0038 |
| | 90/10 | | | | | |

Many modifications may be made in the composition and implementation of this invention without departing from the spirit and scope thereof that are defined only in the appended claims. For example, the exact combination of drag reducing additive(s) and liquid having its friction properties modified may be different from those used here. Additionally, derivatives other than those specifically mentioned may find utility in the methods of this invention. Various combinations of maleated fatty acids, esters and/or salts thereof alone or together with other materials, are also expected to find use as drag reducing agents.

We claim:

1. A method of reducing drag of a fluid, comprising:

continously flowing a fluid; and continously adding to the fluid an amount of an additive thereby reducing the drag of the fluid as compared with the absence of the additive, the additive being selected from the group consisting of amine salts selected from the group consisting of imidazoline salts of; primary, secondary and tertiary amine salts of; heterocyclic amine salts of maleated fatty acids, and maleated fatty acids esters; and inorganic and organic salts of maleated fatty acids, and maleated fatty acid esters and mixtures thereof where an amount of the additive based on the total amount of the fluid ranges from 150 to 600 ppm.

2. The method of claim 1 where the fluid is selected from the group consisting of hydrocarbons, mixtures of hydrocarbons and water, and mixtures of hydrocarbons, water and gas.

3. The method of claim 1 where the additive is selected from the group consisting of:

(I)

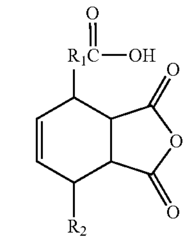

and (II)

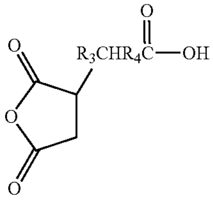

and (III)

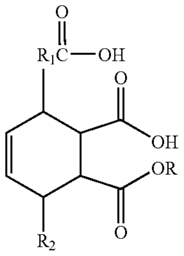

and (IV)

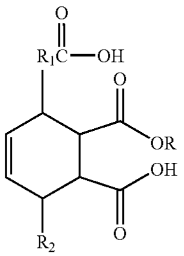

-continued (V)

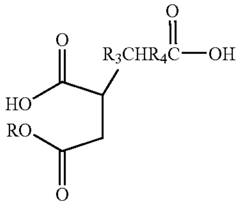

and (VI)

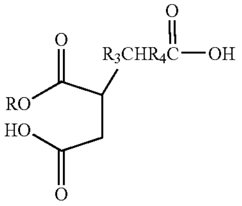

where R is an organic moiety including alkyl, aryl, aralkyl, alkaryl or amine groups;

$R_1$ is a generally linear organic moiety of from about 2 to about 20 carbon atoms;

$R_2$ is hydrogen or a generally linear organic moiety of up to about 20 carbon atoms, where the total number of carbon atoms in $R_1$ and $R_2$ are from about 2 to about 20 carbon atoms;

$R_3$ is an alkylene or alkenylene group of from about 2 to about 15 carbons; and $R_4$ is an alkylene or alkenylene group of from about 2 to about 15 carbons; and inorganic, organic, and amine salts thereof, where the amine salts are selected from the group consisting of imidazoline salts thereof; primary, secondary and tertiary amine salts thereof; heterocyclic amine salts thereof; and mixtures thereof.

4. The method of claim 1 where the additive contains more than one maleated fatty acid, ester and salt thereof.

5. The method of claim 1 where the amount of additive ranges from about 200 to about 500 ppm.

6. A method of reducing drag of a fluid, comprising:

continously flowing a fluid selected from the group consisting of hydrocarbons, mixtures of hydrocarbons and water, and mixtures of hydrocarbons, water and gas; and continously adding to the fluid an amount of an additive thereby reducing the drag of the fluid as compared with the absence of the additive, where the additive is selected from the group consisting of:

(I)

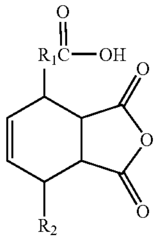

and

-continued (II)

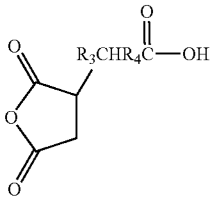

and (III)

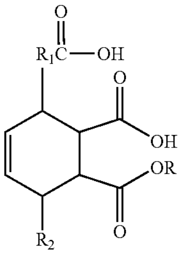

and (IV)

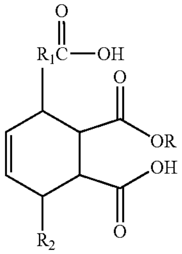

(V)

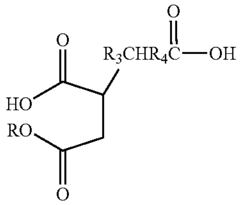

and

-continued (VI)

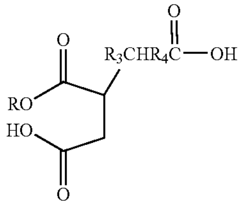

where R is an organic moiety including alkyl, aryl, aralkyl, alkaryl or amine groups;

$R_1$ is a generally linear organic moiety of from about 2 to about 20 carbon atoms;

$R_2$ is hydrogen or a generally linear organic moiety of up to about 20 carbon atoms, where the total number of carbon atoms in $R_1$ and $R_2$ are from about 2 to about 20 carbon atoms;

$R_3$ is an alkylene or alkenylene group of from about 2 to about 15 carbons; and $R_4$ is an alkylene or alkenylene group of from about 2 to about 15 carbons;

and inorganic, organic, and amine salts thereof, where the amine salts are selected from the group consisting of imidazoline salts thereof; primary, secondary and tertiary amine salts thereof; heterocyclic amine salts thereof; and mixtures thereof where an amount of additive based on total amount of fluid ranges from 150 to 600 ppm.

7. The method of claim 6 where the additive contains more than one maleated fatty acid, ester and salt thereof.

8. The method of claim 6 where the amount of additive ranges from about 200 to about 500 ppm.

* * * * *